United States Patent
Chak et al.

(10) Patent No.: US 10,310,715 B2
(45) Date of Patent: Jun. 4, 2019

(54) TRANSITION CONTROLLED E-BOOK ANIMATIONS

(71) Applicant: Google Inc., Mountain View, CA (US)

(72) Inventors: Daniel Chak, San Francisco, CA (US); Xingxing Gu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 15/098,032

(22) Filed: Apr. 13, 2016

(65) Prior Publication Data

US 2017/0300200 A1 Oct. 19, 2017

(51) Int. Cl.
*G06F 3/048* (2013.01)
*G06F 3/0483* (2013.01)
*G06T 13/80* (2011.01)
*G06F 3/0485* (2013.01)

(52) U.S. Cl.
CPC .......... *G06F 3/0483* (2013.01); *G06F 3/0485* (2013.01); *G06T 13/80* (2013.01)

(58) Field of Classification Search
CPC ....... G06F 3/0483; G06F 3/0485; G06F 3/048
See application file for complete search history.

(56) References Cited

U.S. PATENT DOCUMENTS

| | | | | |
|---|---|---|---|---|
| 2009/0303231 A1* | 12/2009 | Robinet | ............... | G06F 3/04815 345/419 |
| 2011/0047504 A1* | 2/2011 | Wienands | ............. | G06F 3/0485 715/786 |
| 2012/0056889 A1* | 3/2012 | Carter | ..................... | G06T 13/00 345/473 |
| 2012/0062604 A1* | 3/2012 | Lobo | ...................... | G06F 3/0485 345/684 |
| 2013/0117653 A1* | 5/2013 | Sukhanov | ............. | G06F 17/212 715/227 |
| 2015/0029197 A1* | 1/2015 | Almosnino | ............. | G06T 13/80 345/474 |
| 2015/0186353 A1* | 7/2015 | Blasko | .................. | G06F 3/0483 715/202 |

(Continued)

OTHER PUBLICATIONS

Wikipedia, "Pop-up book," May 26, 2016, 4 pages [online[ [retrieved on Jul. 29, 2016] Retrieved from the internet <URL: https://en.wikipedia.org/wiki/Popup_book>.

(Continued)

*Primary Examiner* — Mahelet Shiberou (74) *Attorney, Agent, or Firm* — Shumaker & Sieffert, P.A.

(57) ABSTRACT

An e-book includes a rendering definition that specifies how content of the e-book is to be displayed to a user and how the user may interact with the displayed content. The rendering definition defines, for each portion of the e-book, the visual layout of content associated with the portion when the portion is displayed. The rendering definition also defines transition controlled animations for objects displayed in association with the content. The transition controlled animation of an object is an interpolation of the object over time and space that is manipulated by a continuous transition input. The transition input causes a transition from one portion of the e-book to another portion of the e-book. The transition controlled animation of the object is performed during transition from one portion of the e-book to the other portion.

15 Claims, 6 Drawing Sheets

(56) References Cited

U.S. PATENT DOCUMENTS

2016/0035119 A1* 2/2016 Lee .................. G06F 3/0485
  345/473
2016/0231894 A1* 8/2016 Ying .................. G06F 3/0485

OTHER PUBLICATIONS

Tumult Hype, Video for "Tumult Hype 3: Animations," Published on Mar. 17, 2015, 2 Pages, Video can be retrieved on <URL:https://www.youtube.com/watch?v=T4IWhTXjo_w>.

Pugh, G., "How to Make an Interactive eBook Without Any Code," Raywenderlich.com, Sep. 17, 2012, 53 Pages, can be retrieved at <URL:https://www.raywenderlich.com/19415/how-to-make-an-interactive-ebook-without-any-code>.

Lueck, A., "Enchanged eBook Animation; Adobe Edge, Tumult Hype, Sencha Animator," Jun. 7, 2012, 3 pages, can be retrieved at <URL:http://www.storylime.com/blog/2012/06/07/enhanced-ebook-animation-adobe-edge-tumult-hype-sencha-animator/>.

* cited by examiner

TRANSITION CONTROLLED E-BOOK ANIMATIONS

BACKGROUND

Field of Disclosure

This disclosure relates to the field of displaying e-books via a graphical user interface, and specifically to transition controlled animations in e-books.

Description of the Related Art

Many users utilize their digital devices to read digital content for example novels, news articles, short stories, etc., or more generally interact with interactive content. Digital and interactive content is often enhanced and made more engaging using animations that are displayed in conjunction with or embedded within the content. In practice, these animations are often independent from the content being displayed alongside the animation. Such animations end up appearing disconnected from the content and make for an unappealing user experience.

Further, in many platforms, adding animations alongside digital content requires the content provider to write complex programs for managing and executing the animations. These programs make the process of creating animations cumbersome and time-consuming.

SUMMARY

The above and other needs are met by a computer-implemented method, a non-transitory computer-readable storage medium storing executable code, and a system for displaying transition controlled animations in e-books.

One embodiment of the computer-implemented method includes generating a representation of a portion of an e-book for display. The portion of the e-book includes an object associated with a transition controlled animation that is manipulated by a transition between the portion of the e-book to a second portion of the e-book. The method also includes transitioning from the portion of the e-book to the second portion of the e-book, applying an animation effect to the object based on a progression of transitioning from the portion to the second portion to generate a new representation of the object, and transmitting the new representation of the object for display in conjunction with the second portion of the e-book.

One embodiment of the non-transitory computer-readable storage medium stores executable computer program instructions that, when executed by a processor, cause the processor to generate a representation of a portion of an e-book for display. The portion of the e-book includes an object associated with a transition controlled animation that is manipulated by a transition between the portion of the e-book to a second portion of the e-book. The instructions, when executed, also cause the processor to transition from the portion of the e-book to the second portion of the e-book, apply an animation effect to the object based on a progression of transitioning from the portion to the second portion to generate a new representation of the object, and transmit the new representation of the object for display in conjunction with the second portion of the e-book.

One embodiment of the device comprises a processor configured to execute modules, and a memory storing the modules. When the modules are executed by a processor, the processor generates a representation of a portion of an e-book for display. The portion of the e-book includes an object associated with a transition controlled animation that is manipulated by a transition between the portion of the e-book to a second portion of the e-book. The processor also transitions from the portion of the e-book to the second portion of the e-book, applies an animation effect to the object based on a progression of transitioning from the portion to the second portion to generate a new representation of the object, and transmits the new representation of the object for display in conjunction with the second portion of the e-book.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
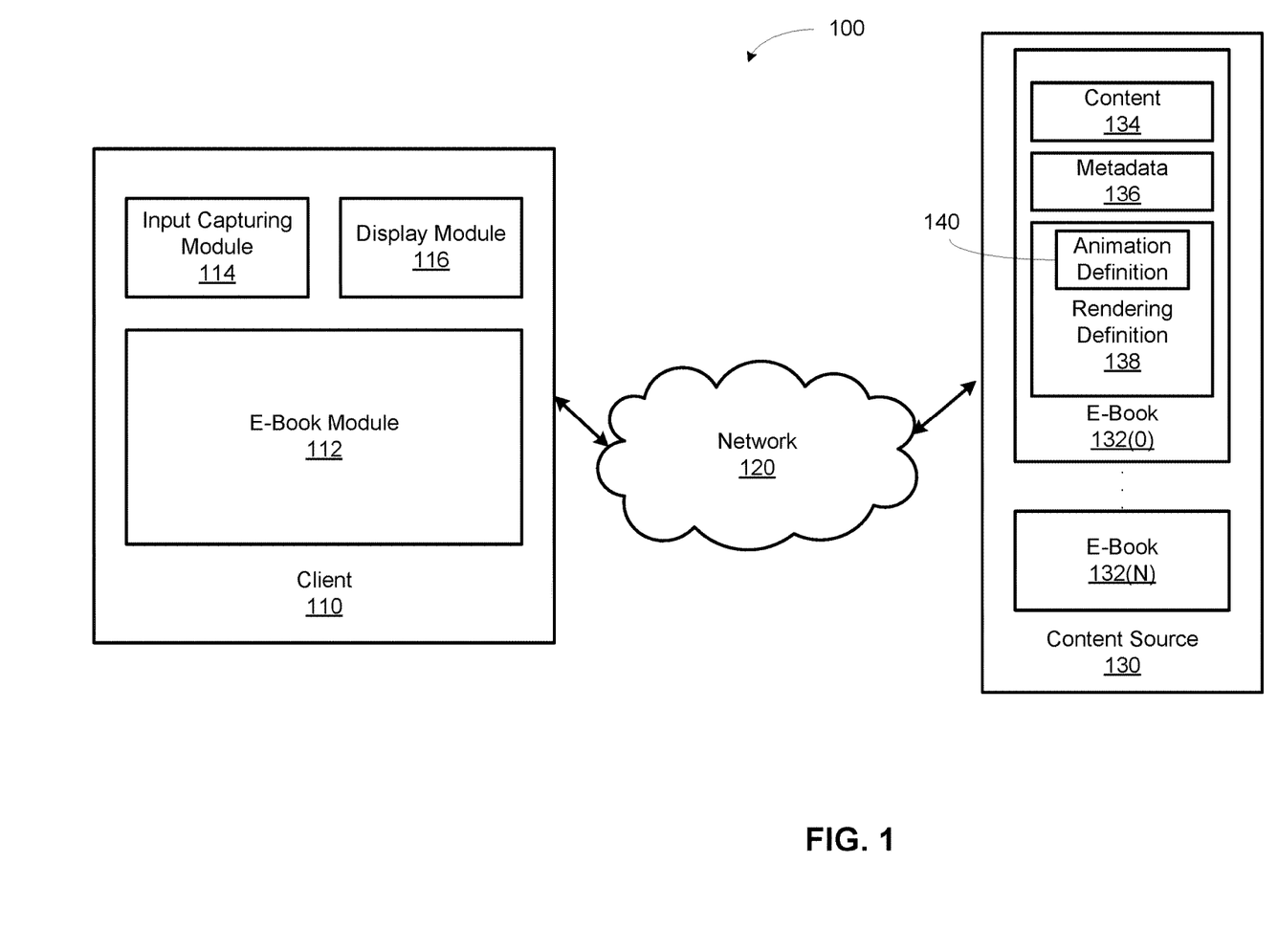
FIG. 1 is a high-level block diagram illustrating an embodiment of an environment for enabling transition controlled animations of e-books.

FIG. 1 is a high-level block diagram illustrating an embodiment of an environment 100 for enabling transition controlled animations of e-books. The environment 100 includes a client 110 coupled via a network 120 to a content source 130. Here only one client 110 and content source 130 are illustrated but there may be multiple instances of each of these entities. For example, there may be thousands or millions of clients 110 in communication with multiple content sources 130.

The network 120 provides a communication infrastructure between the client 110 and the content source 130. The network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

The content source 130 includes one or more computer servers that provide e-books 132(0)-132(N) (collectively, e-books 132, and, individually, e-book 132) to the client 110. The content source 130 may be, for example, an e-book retailer, a library, etc. The content source 130 may directly and/or upon request transmit an e-book 132 to the client 110 via the network 120.

An e-book 132 is an electronic book that includes content 134, metadata 136, and a rendering definition 138. The content 134 includes electronic collection of text (and possibly additional types of content for example images and/or sound). For example, the content 134 includes the content of a book that would be printed on the pages of a traditional paper-based book. All of the text in the collection may be from a single source, or the collection may include text from different sources. The text may have originated in a traditional paper-based format (e.g., a physical book or newspaper) or may have originated in a digital format (e.g., electronic files in a format for example Portable Document Format (PDF), EPUB format, or flowing text format).

The metadata 136 includes bibliographical information about the e-book 132, for example the e-book identifier, title, author, publication date, edition/version number, number of pages, number of chapters, page thumbnails for pages of the e-book, or some combination thereof. The e-book metadata may also include a list of portions into which the e-book's content is divided. A portion is a section of an e-book that includes a subset of the content in an e-book. A portion may be, for example, a page, a chapter, a subsection of a chapter, an index, a map, a bibliography, some other portion of the e-book, or some combination thereof. For example, an e-book can include one portion for each chapter of the e-book, a portion for the index, etc. A portion is represented in the list by a portion ID that uniquely identifies the portion within the e-book (e.g., a chapter number).

The rendering definition 138 specifies how content of the e-book 132 is to be displayed to a user and how the user may interact with the displayed content. In particular, the rendering definition 138 defines, for each portion of the e-book, a content layer that specifies the visual layout of content 134 associated with the portion when the portion is displayed. The layout may be tied to characteristics of the device on which the e-book is being displayed, for example the size of the display screen. The definition of the content layer also specifies how a user may transition from one portion to another. A transition from one portion to another may be a continuous vertical or horizontal swipe gesture. One example of this continuous gesture may be scrolling vertically from one portion to another portion (referred to herein as the "scrolling transition"). Another example of this continuous gesture may be swiping horizontally or vertically on a portion to reveal another portion or a different part of the same portion (referred to herein as the "page advance transition").

In addition, the rendering definition 138 defines, for a portion of the e-book, one or more object layers that each identifies at least one object to be displayed in conjunction with the content layer and an animation definition 140 associated with the object(s). An object is a representation of an image or a series of animated images in computer graphics. In various embodiments, an object may be a bitmap, a set of vector graphics, or a combination thereof. The animation definition 140 describes at least one transition controlled animation to be applied to the object(s) within an object layer. In one embodiment, the transition controlled animation of an object is an interpolation of the object over time and space that is manipulated or controlled by a continuous transition input causing a transition from one portion of the e-book to another portion of the e-book. The transition input may be a user input or a system generated input independent of user manipulation. A transition controlled animation is also referred to herein as an "animation."

To describe an animation, the animation definition 140 specifies the type of transition that controls the animation. The animation definition 140 may additionally specify how an object is displayed during the animation. The type of transition describes the transition/movement through the content of the e-book that influences the animation. The type of transition may be a scrolling transition or a page advance transition. In one embodiment, the start and end of the animation is defined in terms of the transition type. For the scrolling transition, the start and end of the animation specifies a starting scroll position within the portion when the animation begins and an ending scroll position within the portion when the animation ends. For the page advance transition, the start and end of the animation specifies a start page turn position at which the animation begins and an end page turn position at which the animation ends. In one embodiment, the start and end page turn positions are specified as a percentage of the page turn completed.

The animation definition 140 may also specify the type of animation effect to be applied to the object being animated and, optionally, one or more parameters for computing the animation effect. The animation effect describes the transformation applied to the object as the transition is in progress. Animation effects include translation, rotation, scale, transparency, shake, a key frame animation, etc. Each type of animation effect is associated with one or more computational functions. The parameters for computing the animation effect are object-specific inputs into the computational functions associated with the animation effect. For example, for a scale animation effect, the parameters may include a starting scale factor and an ending scale factor for computing the scaled version of the object during the animation.

The client 110 is a computing device that executes computer program modules—e.g., a web browser or other client application—that allow a user to view e-books, newsfeeds, browse the internet, and generally consume media content. The client 110 may be, for example, a personal computer, a tablet computer, a smart phone, a laptop computer, a dedicated e-reader, or other type of network-capable device for example a networked television or set-top box.

The client 110 includes an input capturing module 114, a display module 116, and an e-book module 112. In one embodiment, the input capturing module 114, the display module 116, and the e-book module 112 are software application modules executing on the client 110. For example, the input capturing module 114, the display module 116, and the e-book module 112 may be integrated into a smart phone application executing on a smart phone.

The input capturing module 114 captures user input from a user of the client 110 and transmits the user input to the relevant module executing on the client 110. The user input may be a touch on a screen, for example a tap or a swipe, or a movement effectuated by an input device, for example a mouse. As discussed above, in the context of e-books, a user input captured by the input capturing module 114 may be a scrolling transition or a page advance transition, where the user transitions from one portion of the e-book, for example a page of the e-book, to another portion, for example a next or previous page of the e-book, using a continuous gesture captured by the input capturing module 114. In one embodiment, a continuous gesture is a movement made by the user while contacting an e-book interface through touch or via an input device over a period of time. Gestures may include, for example, tapping a portion of the screen, touching a portion of the screen and then dragging the touched portion in a particular direction, touching several places on the screen and bringing the touched portions closer together, etc. For example, for a page advance transition, a user may transition from a page to a previous page in the e-book by swiping horizontally from left to right across the e-book page. Likewise, a user may transition from a page to a next page in the e-book by swiping horizontally from right to left across the e-book page. For a scrolling transition, a user may transition from one part of a page of the e-book, for example, the top of the page, to another part of the page, for example, the bottom of the page, by swiping vertically from top to bottom across the e-book page. Additionally, for the scrolling transition, a user may transition from one page of the e-book to another page of the e-book by swiping vertically. The display module 116 generates a display for presentation to a user of the client 110 based on data received from a module executing on the client 110.

The e-book module 112 enables a user of the client 110 to download (via one or more graphical user interfaces) e-books 132 from the content source 130 and to read and/or otherwise interact with an e-book. For example, the e-book module 112 may include an interface that allows a user to read a portion of a e-book, bookmark a portion of an e-book, highlight a portion of an e-book, comment on a portion of e-book, view metadata about a portion of the e-book, or some combination thereof.

For e-books 132 that have embedded transition controlled animations, the e-book module 112 enables a user to control and view the animations by performing the requisite transitions over the content of the e-book. The animations of objects in the e-book are often connected to the content of the e-book closely. Thus, the content consumption user experience is enhanced when the user's continuous gesture controls how the animation progresses synchronously with the transition.

Figure 2:
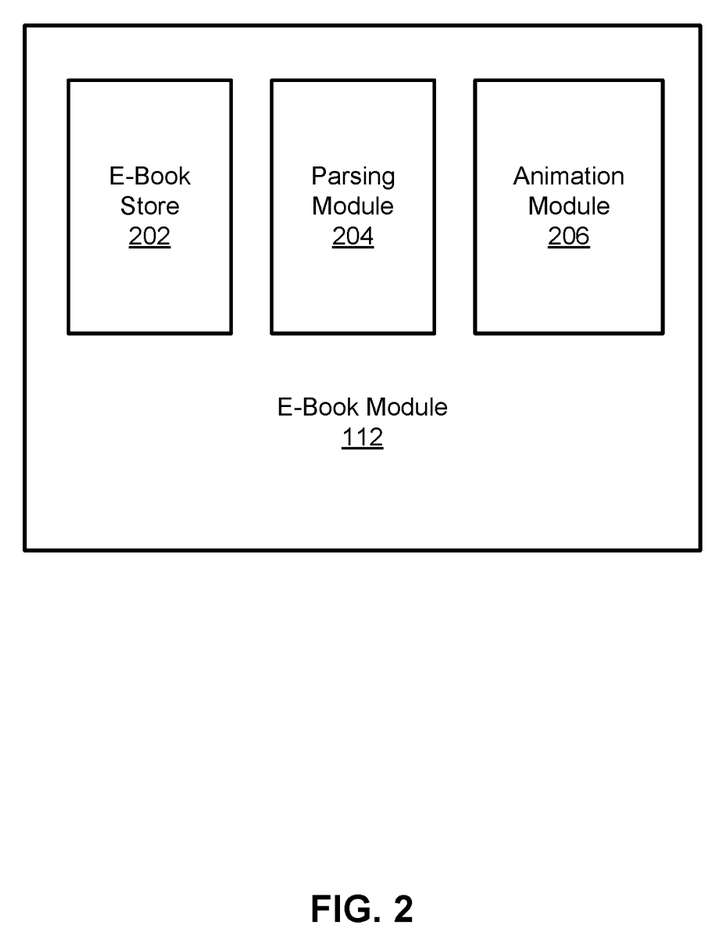
FIG. 2 is a block diagram illustrating components of the e-book module, according to an embodiment.

FIG. 2 is a block diagram illustrating components of the e-book module 112, according to an embodiment. The e-book module 112 includes an e-book store 202, a parsing module 204, and an animation module 206. Other embodiments may include different and/or additional modules.

The e-book store 202 stores information relating to e-books received from the content source 130. Such information relating to a given e-book includes the content 134, the metadata 136, and rendering definition 138 received from the content source 130. The information may also include locally captured or generated information for example a user's bookmark, current reading location, and/or locally made annotations. When the store e-book module 112 or other entities disclosed herein collect personal information about users, or makes use of personal information, the user may control whether programs or features collect user information (e.g., information about a user's social network, social actions or activities, a user's preferences, user's e-books, a user's current location in an e-book). In addition, certain data may be treated in one or more ways before it is stored or used, so that personally identifiable information is removed. For example, a user's identity may be anonymized so that no personally identifiable information can be determined for the user. Thus, the user may have control over how information is collected about the user and used by the e-book module 112 and/or other entities.

The parsing module 204 processes the rendering definition 138 of an e-book selected by a user of the e-book module 112 to determine how to display the e-book. In operation, the parsing module 204 generates a representation of an e-book including a plurality of e-book pages and objects associated with the plurality of e-book pages. Each e-book page includes a portion of the content 134 formatted according to the content layer defined in the rendering definition 138 associated with the relevant portion of the e-book. The amount of content 134 in an e-book page may vary based in part on the area of the display available to present e-book content, the font size, and/or other factors.

The object(s) in the representation are positioned and visually formatted according to the object layer(s) defined in the rendering definition 138 associated with the relevant portion of the e-book. The parsing module 204 transmits the representation to the display module 116 for presentation to the user of the client 110.

For a given object in the representation, the parsing module 204 also determines whether the rendering definition 138 includes an animation definition 140 associated with the object. As discussed above, an animation definition 140 describes a transition controlled animation to be applied to an object during a transition of one portion of the e-book to another portion. When an object in the representation is associated with an animation definition 140, the parsing module 204 transmits a notification to the animation module 206 indicating that an object associated with an animation definition 140 is currently being displayed or may be displayed to the user at a future time.

The animation module 206 monitors transition inputs captured by the input capturing module 114 and, when appropriate, translates the transition inputs into animating objects currently on display. Specifically, when a scrolling transition or a page advance transition is captured by the input capturing module 114, the animation module 206 determines whether any of the objects currently on display are impacted by the transition based on the associated animation definition 140. For each object on display, the animation module 206 accesses the associated animation definition 140 to (1) determine whether the type of transition identified in the animation definition 140 matches the type of transition associated with the transition input and, if so, (2) compute the animation effect to be applied to the object given the transition associated with the transition input. The animation module 206 computes the animation effect based on the parameters in the animation definition 140 and transmits a representation of the object with the applied animation effect to the display module 116 for display to the user.

Figure 3:
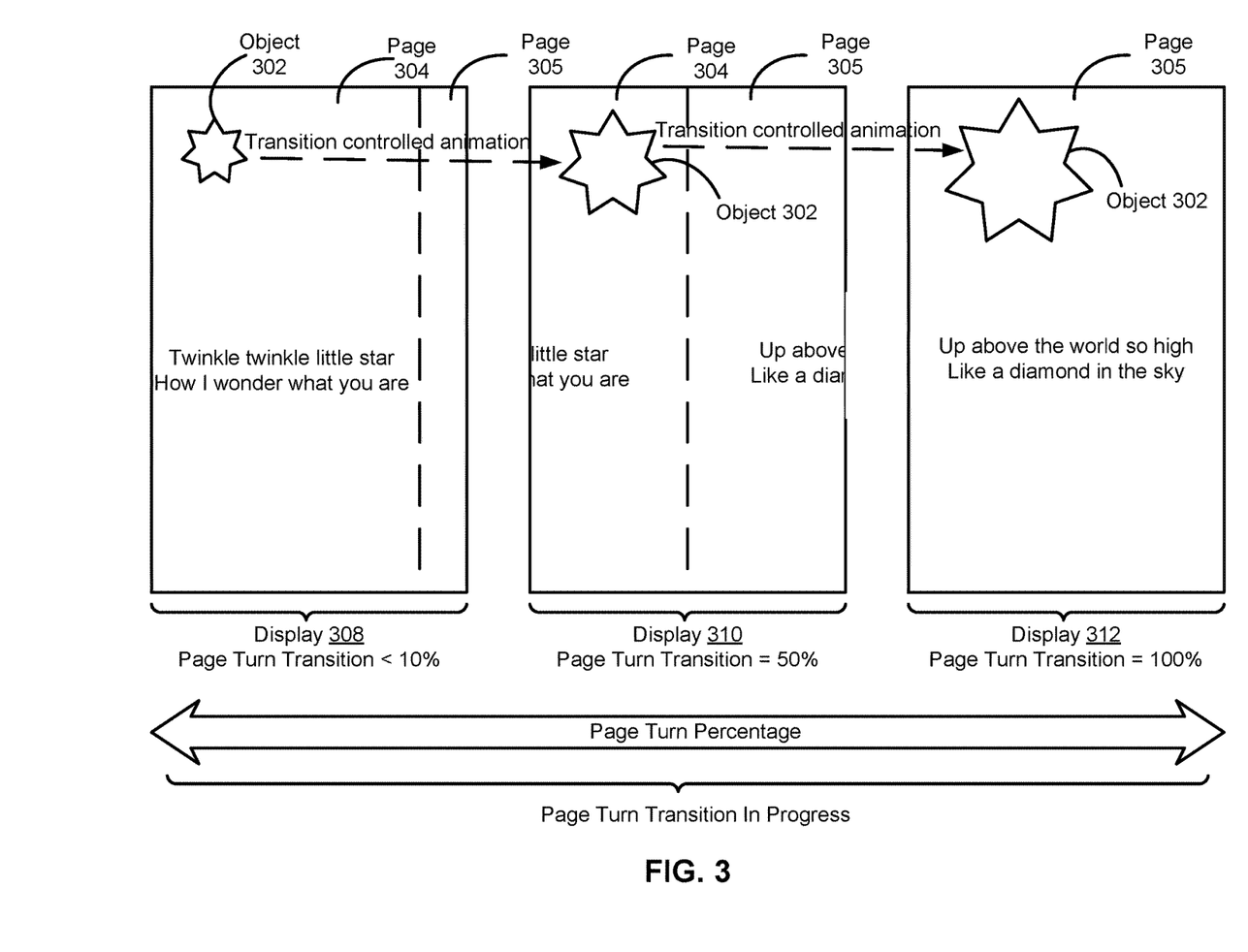
FIG. 3 illustrates an example of a page advance transition controlled animation, according to an embodiment.

FIG. 3 illustrates an example of a page advance transition controlled animation, according to an embodiment. In the illustrated example, the object 302 is associated with an animation definition 140 that defines a scaling animation manipulated by a page advance transition from page 304 to page 305. The object 302 expands in size as the page advance transition from page 304 to page 305 progresses. The size of the object 302 at any given point in the page advance transition is determined based on the animation definition 140 associated with the object 302.

The animation module 206 monitors transition inputs, captured by the input capturing module 114 or automatically generated by the e-book module 112, while page 304 including object 302 is being displayed to a user. When the input capturing module 114 receives a transition input for a page advance transition from page 304 to page 305, the animation module 206 computes the scaling animation to be applied to the object 302 as the page advance transition progresses from zero to a hundred percent. In one embodiment, the transition input for the page advance transition is continuous over a period of time causing the page transition to progress from zero to a hundred percent via a single user input, for example a horizontal swipe across a touch interface. In such an embodiment, the animation module 206 iteratively computes the scaling animation to be applied to the object 302 as the page advance transition progresses.

For the remaining discussion, assume that the animation definition 140 associated with object 302 specifies the following:

Transition Type: Page-Turn Transition
Animation Start: 10% Page Transition
Animation End: 90% Page Transition
Animation Effect: Scale
Effect Parameters: Start Scale=1; End Scale=2

The "Transition Type" specified in the animation definition 140 indicates the type of transition in the e-book that controls the associated animation. The "Animation Start" specified in the animation definition 140 indicates a point within the transition from a first portion to a second portion at which the animation described by the animation definition 140 starts. The "Animation End" specified in the animation definition 140 indicates a point within the transition from the first portion to the second portion at which the animation described by the animation definition 140 ends. The "Animation Effect" specified in the animation definition 140 indicates the effect to be applied to the object being animated as the transition progresses. The "Effect Parameters" specified in the animation definition 140 indicate any animation-specific or object-specific parameters associated with the animation effect.

When the page advance transition is less than ten percent, as shown in display 308, the animation module 206 analyzes the animation definition 140 associated with the object 302 and determines that an animation effect does not need to be applied at this stage since the page advance transition percentage is less than the "Animation Start" parameter indicated in the animation definition 140. The scaling factor of the object 302 is set to the "Start Scale" parameter in the animation definition 140.

As the page advance transition progresses, as shown in display 310, the animation module 206 analyzes the animation definition 140 associated with the object 302 and determines that an animation effect should be applied at this stage since the page turn percentage is greater than the "Animation Start" parameter and less than the "Animation End" parameter. To compute the animation effect to be applied, the animation module 206 determines the "Animation Effect" specified in the animation definition 140 and computes a scaling factor for the object 302 based on the specified effect and the "Start Scale" and "End Scale" parameters. The animation module 206 applies the scaling factor to the object 302 to generate a new representation of the object 302. The display module 116 then displays the new representation of the object 302 in conjunctions with the page 304 and/or page 305, as the case may be.

In one embodiment, for the scaling animation effect, the animation module 206 computes the scaling factor for the object 302 according to the following formula:

$$\frac{CurrenTurnPercentage - StartTurnPercentage}{EndTurnPercentage - StartTurnPercentage} \times \frac{EndScale}{StartScale}$$

where CurrenTurnPercentage is the current page advance transition percentage, StartTurnPercentage is the page advance transition percentage at which the animation starts, as defined in the animation definition 140, EndTurnPercentage is the page advance transition percentage at which the animation ends, as defined in the animation definition 140, EndScale is the End Scale parameter, as defined in the animation definition 140, and StartScale is the Start Scale parameter, as defined in the animation definition 140.

When page advance transition ends, as shown in display 312, the animation module 206 analyzes the animation definition 140 associated with the object 302 and determines that an animation effect should not be applied at this stage since the page turn percentage is greater than the "Animation End" parameter. The scaling factor of the object 302 is set to the "End Scale" parameter in the animation definition 140.

In one embodiment, the animation module 206 applies the animation effect to the object 302 irrespective of the direction of the page advance transition, i.e., irrespective of whether the page advance transitions forward from page 304 to page 305 or transitions backward from page 305 to page 304. When the page advance transitions backward, the animation effect is applied in reverse. For example, in the illustration of FIG. 3, the object 302 would be visually represented with a scaling factor equaling "End Scale" at the start of the page advance transition from page 305 to page 304 and tend toward the scaling factor equaling "Start Scale" as the page advance transition progresses.

Figure 4:
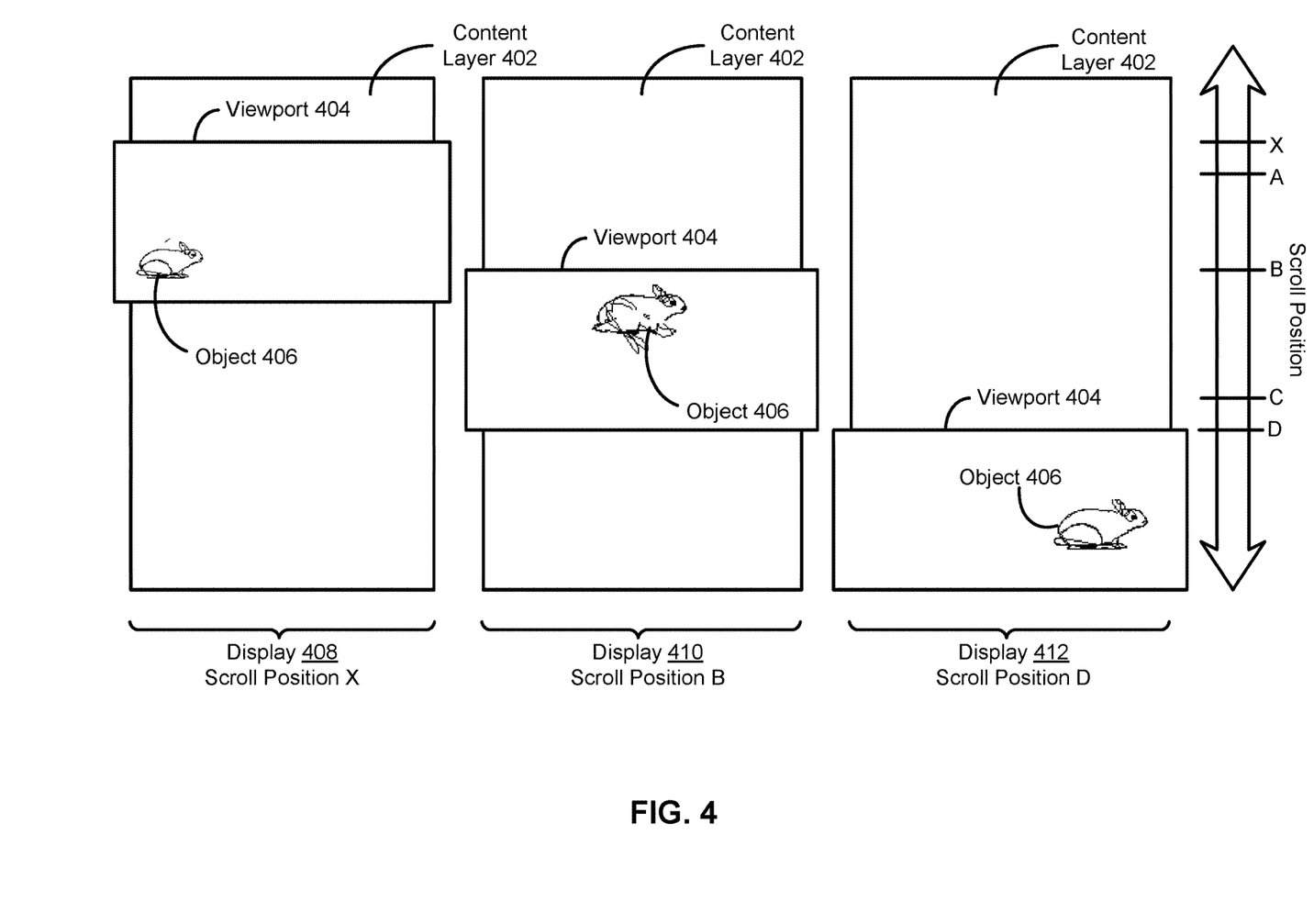
FIG. 4 illustrates an example of a scrolling transition controlled animation, according to an embodiment.

FIG. 4 illustrates an example of a scrolling transition controlled animation, according to an embodiment. In the illustrated example, the object 406 is associated with an animation definition 140 that defines a translation animation manipulated by a scrolling transition from scroll position A to scroll position C.

The animation module 206 monitors transition inputs captured by the input capturing module 114 while content layer 402 and object 406 are displayed to a user. In one embodiment, the user vertically scrolls over the content layer 402 causing the viewport 404 to move vertically over the content layer 402. The portion of the content layer 402 covered by the viewport 404 at any given time is displayed to the user. When the input capturing module 114 receives a user input for scrolling over the content layer 402 and thus moving the viewport from one scroll position to another, the animation module 206 computes the translation animation to be applied to the object 404 as the scrolling transition progresses. In one embodiment, the user input for the scrolling transition is continuous over a period of time causing the scrolling transition to progress from one position to another via a single user input, for example a vertical swipe across a touch interface. In such an embodiment, the animation module 206 iteratively computes the translation animation to be applied to the object 406 as the scrolling transition progresses.

For the remaining discussion, assume that the animation definition 140 associated with object 406 specifies the following:
Transition Type: Scrolling Transition
Animation Start: Scroll Position A
Animation End: Scroll Position C
Animation Effect: Translation
Effect Parameters: Start Position=Start_Coordinates; End Position=End_Coordinates When the scroll position is not within A and C, as shown in display 408, the animation module 206 analyzes the animation definition 140 associated with the object 406 and determines that an animation effect does not need to be applied at this stage since the scroll position X is not within the "Animation Start" and "Animation End" scroll positions indicated in the animation definition 140. The position of the object 406 within the viewport 404 is set to the "Start Position" parameter in the animation definition 140.

As the scrolling transition progresses, as shown in display 410, the animation module 206 analyzes the animation definition 140 associated with the object 406 and determines that an animation effect should be applied at this stage since the scroll position is within the scroll positions "Animation Start" and "Animation End" scroll positions indicated in the animation definition 140. In the particular illustration, the scroll position in display 410 is "B," which is within the scroll positions "A" and "C". To compute the animation effect to be applied, the animation module 206 determines the "Animation Effect" specified in the animation definition 140 and generates a translation for the object 406 based on the specified effect and the "Start Position" and "End Position" parameters. The animation module 206 applies the translation to the object 406 to generate a new representation of the object 406. The display module 116 then displays the new visual representation of the object 406 in conjunction with the content layer 402.

When scrolling transition ends, as shown in display 412, the animation module 206 analyzes the animation definition 140 associated with the object 406 and determines that an animation effect should not be applied at this stage since the scroll position D is not within the "Animation Start" and "Animation End" scroll positions indicated in the animation definition 140. The position of the object 406 within the viewport 404 is set to the "End Position" parameter in the animation definition 140.

In one embodiment, the animation module 206 applies the animation effect to the object 302 irrespective of the direction of the scrolling transition, i.e., whether the scroll transitions upward or downward over the content layer 402. When the scroll transitions upward, the animation effect is applied in reverse. For example, in the illustration of FIG. 4, the object 406 would be visually represented at a position equaling "End Position" at the start of the scrolling transition and tend toward the position equaling "Start Position" as the scaling transition progresses.

Figure 5:
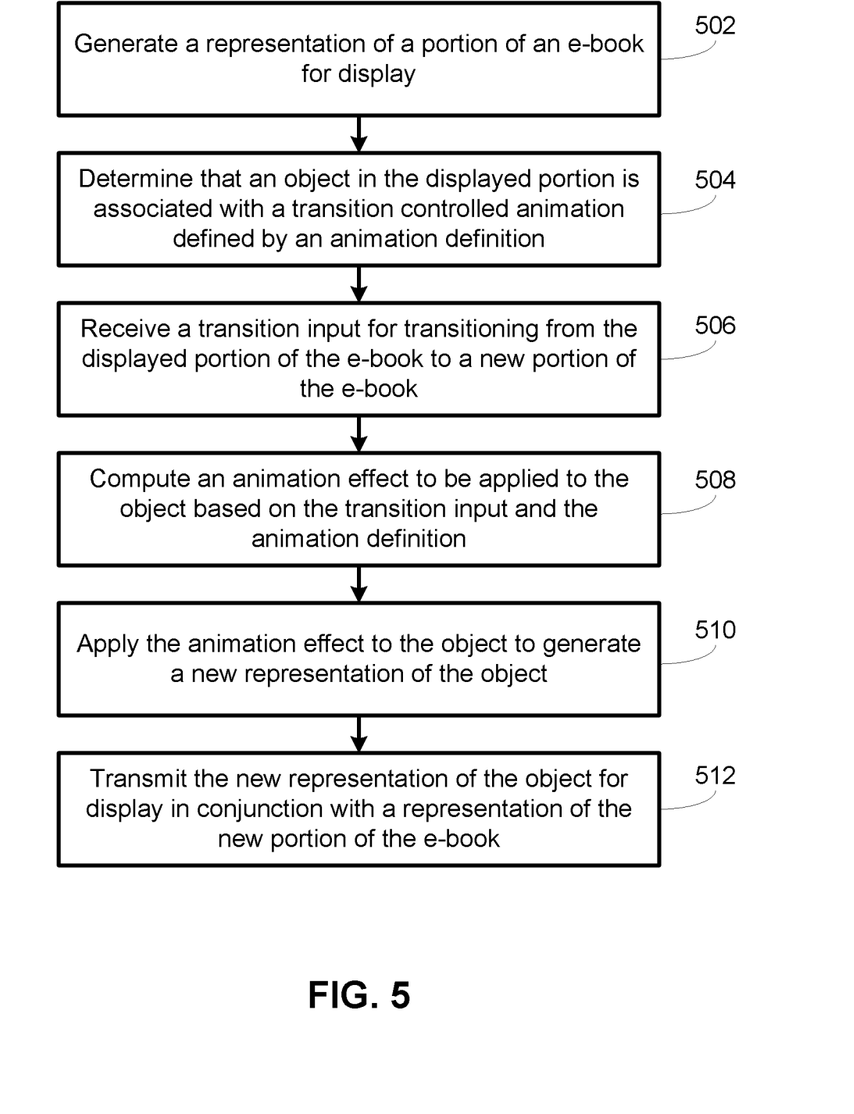
FIG. 5 is a flowchart illustrating a process for displaying a transition controlled animation in an e-book, according to one embodiment.

FIG. 5 is a flowchart illustrating a process for displaying a transition controlled animation in an e-book, according to one embodiment. Other embodiments may include different and/or additional steps. In addition, the steps may be performed in different orders.

In step 502, the e-book module 112 generates a representation of a portion of the e-book for display. The portion of the e-book includes an object. In operation, the e-book module 112 formats the object and the content of the e-book portion according to the rendering definition associated with the portion. The display module 116 generates a display of the representation for presentation to the user of the client 110.

In step 504, the e-book module 112 determines that the object in the displayed portion is associated with a transition controlled animation defined by an animation definition 140. The transition controlled animation of the object is an interpolation of the object over time and space that is manipulated by a continuous transition input causing a transition from the portion of the e-book to the new portion of the e-book. The animation definition 140 defines the type of transition that controls the animation of the object and how to compute the animation effect to be applied to the object during such a transition.

In step 506, the e-book module 112 receives a transition input for transitioning from the displayed portion of the e-book to the new portion of the e-book. In one embodiment, the transition input is a page advance transition causing a transition from one page of the e-book to another. In another embodiment, the transition input is a scrolling transition causing a vertical transition from the displayed portion to the new portion. The transition input may be based on a user input to the e-book module 112 or may be an automatically generated input, for example an automatic scroll of a portion of the e-book.

In step 508, the e-book module 112 computes an animation effect to be applied to the object based on the received transition input and the animation definition 140 defining the transition controlled animation associated with the object. The animation effect may be computed based on the progress of the transition from the displayed portion to the new portion and any animation parameters defined in the animation definition 140.

In step 510, the e-book module 112 applies the computed animation effect to the object to generate a new representation of the object. In step 512, the e-book module 112 transmits the new representation of the object for display to the user in conjunction with a representation of the new portion of the e-book.

Figure 6:
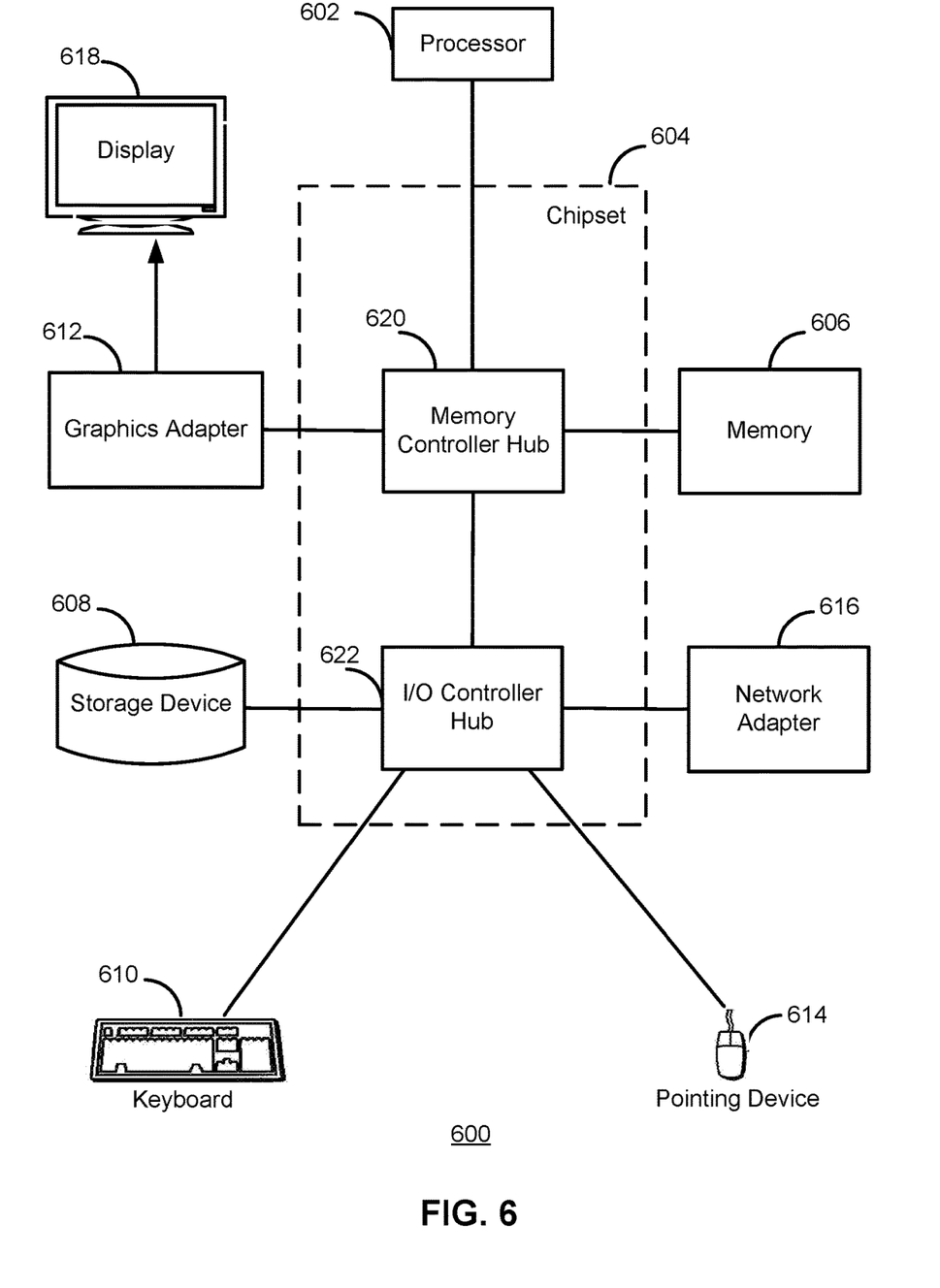
FIG. 6 is a high-level block diagram illustrating an example computer for implementing one or more of the entities shown in FIG. 1.

FIG. 6 is a high-level block diagram illustrating an example computer 600 for implementing one or more of the entities shown in FIG. 1. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input interface 614, and network adapter 616 are coupled to the I/O controller hub 622. Other embodiments of the computer 600 have different architectures.

The storage device 608 is a non-transitory computer-readable storage medium for example a hard drive, compact disk read-only memory (CD-ROM), DVD, or a solid-state memory device. The memory 606 holds instructions and data used by the processor 602. The input interface 614 is a touch-screen interface, a mouse, track ball, or other type of pointing device, a keyboard, or some combination thereof, and is used to input data into the computer 600. In some embodiments, the computer 600 may be configured to receive input (e.g., commands) from the input interface 614 via gestures from the user. The computers 600 monitors gestures made by the user and converts them into commands (e.g., scroll horizontally, scroll vertically, summary view command, selection of a page thumbnail, etc.) The graphics adapter 612 displays images and other information on the display 618. The network adapter 616 couples the computer 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIG. 1 can vary depending upon the embodiment and the processing power required by the entity. For example, the client 600 may interact with one or more servers working together to provide the functionality described herein. The computers 600 can lack some of the components described above, for example keyboards, graphics adapters 612, and displays 618.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating graphical user interfaces for summary views that facilitate navigation of e-books. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for displaying a transition controlled animation in an e-book, the method comprising:
    outputting, by a computing device and for display, an indication of a first graphical user interface comprising a first page of the e-book, the first page of the e-book comprising content including text and a graphical object;
    receiving, by the computing device, an indication of user input indicative of a command to transition from the first page of the e-book to a second page of the e-book;
    responsive to receiving the indication of user input indicative of the command to transition from the first page of the e-book to the second page of the e-book and while a progression of the transition from the first page of the e-book to the second page of the e-book satisfies an animation start parameter and an animation end parameter, animating, by the computing device, the graphical object based on the animation start parameter, the animation end parameter, and the progression of the transition from the first page of the e-book to the second page of the e-book, wherein the animation start parameter indicates a point within the transition from the first page of the e-book to the second page of the e-book at which the animation starts, and wherein the animation end parameter indicates a point within the transition from the first page of the e-book to the second page of the e-book at which the animation ends; and
    after animating the graphical object, outputting, by the computing device and for display, an indication of a second graphical user interface comprising an updated version of the graphical object and the second page of the e-book.

2. The method of claim 1, wherein animating the graphical object is further based on a type of animation effect associated with the graphical object.

3. The method of claim 1, wherein the indication of the user input is indicative of a continuous input over a period of time, and wherein animating the graphical object comprises iteratively determining, based at least in part on the indication of the continuous input, a scaling factor to apply to the object over the period of time.

4. The method of claim 1, wherein the user input is a first user input, wherein the first graphical user interface includes an initial version of the graphical object, the method further comprising:
    receiving, by the computing device, an indication of a second user input indicative of a command to transition from the second page of the e-book to the first page of the e-book;
    responsive to receiving the indication of user input indicative of the command to transition from the second page of the e-book to the first page of the e-book and while a progression of the transition from the second page of the e-book to the first page of the e-book satisfies the animation start parameter and the animation end parameter, animating, by the computing device, the graphical object in reverse based at least in part on a progression of the transition from the second page of the e-book to the first page of the e-book; and
    after animating the graphical object in reverse, outputting, by the computing device and for display, an indication of a third graphical user interface comprising the initial version of the graphical object and at least a segment of the first page of the e-book.

5. The method of claim 1, wherein the indication of the user input comprises an indication of a continuous touch input over a display device displaying the first page of the e-book.

6. The method of claim 1,
    wherein a value of the animation start parameter indicates an amount of the transition from the first page of the e-book to the second page of the e-book at which the animation begins, wherein a value of the animation end parameter indicates an amount of the transition from the first page of the e-book to the second page of the e-book at which the animation ends, and wherein animating the graphical object comprises:
 initiating, by the computing device, the animation in response to determining that the amount of the progression of the transition is greater than the value of the start animation parameter; and
 terminating, by the computing device, the animation in response to determining that the amount of the progression of the transition is greater than the value of the end animation parameter.

7. The method of claim 1, wherein animating the graphical object comprises at least one of:
 translating the graphical object,
 rotating the graphical object,
 scaling the graphical object,
 adjusting a transparency of the graphical object, or
 shaking the graphical object.

8. The method of claim 1, wherein animating the graphical object further comprises:
 receiving, by the computing device, from rendering definition data corresponding to the e-book, data describing at least one animation to be applied to the graphical object,
 wherein the rendering definition data defines, for each page of the e-book, one or more object layers identifying one or more graphical objects to be displayed, and that defines at least one animation to be applied to at least one graphical object of the one or more graphical objects.

9. A non-transitory computer-readable storage medium storing instructions that, when executed by a processor, cause the processor to:
 output, for display, an indication of a first graphical user interface comprising a first page of an e-book, the first page of the e-book comprising content including text and a graphical object;
 receive an indication of user input indicative of a command to transition from the first page of the e-book to a second page of the e-book;
 responsive to receiving the indication of user input indicative of the command to transition from the first page of the e-book to the second page of the e-book and while a progression of the transition from the first page of the e-book to the second page of the e-book satisfies an animation start parameter and an animation end parameter, animate the graphical object based on the animation start parameter, the animation end parameter, and the progression of the transition from the first page of the e-book to the second page of the e-book, wherein the animation start parameter indicates a point within the transition from the first page of the e-book to the second page of the e-book at which the animation starts, and wherein the animation end parameter indicates a point within the transition from the first page of the e-book to the second page of the e-book at which the animation ends; and
 after animating the graphical object, output, for display, an indication of a second graphical user interface comprising an updated version of the graphical object and the second page of the e-book.

10. The non-transitory computer-readable storage medium of claim 9, wherein execution of the instructions further cause the processor to animate the graphical object further based on a type of animation effect associated with the graphical object.

11. The non-transitory computer-readable storage medium of claim 9, wherein the indication of the user input is indicative of a continuous input over a period of time, and wherein the instructions cause the processor to animate the graphical object by at least causing the processor to iteratively determine, based at least in part on the indication of continuous input, a scaling factor to apply to the object over the period of time.

12. The non-transitory computer-readable storage medium of claim 9, wherein the user input is a first user input, wherein the first graphical user interface includes an initial version of the graphical object, wherein execution of the instructions further cause the processor to:
 receive an indication of a second user input indicative of a command to transition from the second page of the e-book to the first page of the e-book;
 responsive to receiving the indication of user input indicative of the command to transition from the second page of the e-book to the first page of the e-book and while a progression of the transition from the second page of the e-book to the first page of the e-book satisfies the animation start parameter and the animation end parameter, animating, by the computing device, the graphical object in reverse based at least in part on a progression of the transition from the second page of the e-book to the first page of the e-book; and
 after animating the graphical object in reverse, outputting, by the computing device and for display, an indication of a third graphical user interface comprising the initial version of the graphical object and at least a segment of the first page of the e-book.

13. The non-transitory computer-readable storage medium of claim 9, wherein the indication of the user input comprises an indication of a continuous touch input over a display device displaying the first page of the e-book.

14. A computer system comprising:
 a processor; and
 a memory storing instructions that, when executed by the processor, cause the processor to:
  output, for display, an indication of a first graphical user interface comprising a first page of an e-book, the first page of the e-book comprising content including text and a graphical object;
  receive an indication of user input indicative of a command to transition from the first page of the e-book to the second page of the e-book;
  responsive to receiving the indication of user input indicative of the command to transition from the first page of the e-book to a second page of the e-book, animate the graphical object by at least causing the processor to:
   initiate the animation in response to determining that a value of a progression of the transition is greater than a value of an animation start parameter, wherein the value of the animation start parameter indicates an amount of the transition from the first page of the e-book to the second page of the e-book at which the animation begins;
   while the value of the progression of the transition from the first page of the e-book to the second page of the e-book is greater than the value of the animation start parameter and less than a value of an animation end parameter, animate the graphical object based on the value of the animation start parameter, the value of the animation end parameter, and the value of the progression of the transition from the first page of the e-book to the second page of the e-book; and terminate the animation in response to determining that the value of the progression of the transition is greater than the value of the animation end parameter, wherein the value of the animation end parameter indicates an amount of the transition from the first page of the e-book to the second page of the e-book at which the animation ends; and after animating the graphical object, output, for display, an indication of a second graphical user interface comprising an updated version of the graphical object and the second page of the e-book.

15. The computer system of claim 14, wherein execution of the instructions further cause the processor to animate the graphical object further based on a type of animation effect associated with the graphical object.

* * * * *